(No Model.)

E. HILL.
MODE OF RE-ENFORCING TUBULAR OR HOLLOW STRUCTURES.

No. 339,885. Patented Apr. 13, 1886.

WITNESSES:
C. Neveux
C. Sedgwick

INVENTOR:
E. Hill
BY Munn & Co
ATTORNEYS.

UNITED STATES PATENT OFFICE.

EBENEZER HILL, OF SOUTH NORWALK, CONNECTICUT.

MODE OF RE-ENFORCING TUBULAR OR HOLLOW STRUCTURES.

SPECIFICATION forming part of Letters Patent No. 339,885, dated April 13, 1886.

Application filed May 23, 1885. Serial No. 166,464. (No model.)

*To all whom it may concern:*

Be it known that I, EBENEZER HILL, of South Norwalk, in the county of Fairfield and State of Connecticut, have invented a new and Improved Method of Constructing and Strengthening Hollow Bodies Exposed to High Pressure, of which the following is a full, clear, and exact description.

This invention is applicable to hollow structures or bodies exposed to high or excessive fluid, aeriform, and gaseous pressures, including pipes and vessels of different kinds—as, for instance, reservoirs for holding air and gases under pressure, cylinders, and pipes of hydraulic engines and other similar machines which are subjected to heavy internal fluid-pressures and that ordinarily require their walls to be made of great thickness to resist such pressures. It is also applicable to ordnance for resisting the bursting-pressure put thereon when exploding the charge.

The invention consists in re-enforcing the vessel or hollow structure exposed to such high or excessive pressure internally with outer vessels or structures arranged to inclose the first-named vessel or structure, the same being charged successively with diminishing pressures from the innermost to the outermost vessel of the whole structure. By thus constructing and subjecting the whole vessel or structure to different pressures, diminishing outwardly, a counteracting pressure is brought to bear upon the exterior of each inner vessel or structure which will greatly conduce to the strength of the structure as regards any bursting-strain to which it may be exposed, and admit of its walls being built very much lighter to resist an internal heavy strain or pressure than is otherwise practicable. This admits of light castings being used to resist exceedingly high pressure and contributes very materially to the safety of the structure.

Reference is had to the accompanying drawings, which form part of this specification, and which represents my invention as applied, by way of illustrating its principle of action, to three different vessels or hollow structures to be used for different purposes.

Figure 1:
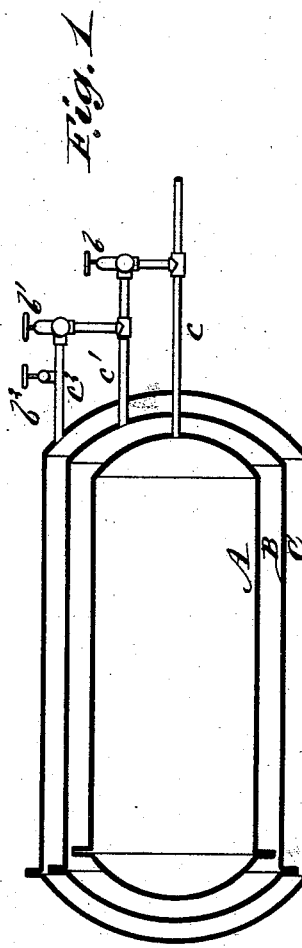
Figure 2:

Figure 1 represents a longitudinal sectional view of a reservoir embodying my invention, for holding air or gas under pressure; Fig. 2, a similar view of a hydraulic-press cylinder; and Fig. 3, a like view of a cannon, to both of which the invention is or may be also applied.

Referring in the first instance to Fig. 1 of the drawings, A indicates the innermost vessel designed to hold the air or gas at the extreme high pressure at which it is required to use or work it; B, an outer vessel or chamber, inclosing the vessel A; and C, a further outer chamber or vessel, inclosing the vessel B. Any number of such vessels or chambers arranged one outside of the other may be used. By way of illustration I will suppose each of these vessels to be built of a strength to withstand an internal pressure of one thousand pounds to the square inch. If only two of such vessels be used, and the outer one be charged with air or gas at such named pressure, then the inner vessel, if charged with air or gas at a like pressure, will be relieved of all strain on its walls by reason of the inner pressure on it balancing the outer pressure; and if the pressure on the interior of the inner vessel be increased to two thousand pounds, then the pressure within the outer vessel remaining at one thousand pounds will reduce the strain on the interior of the inner vessel to one thousand pounds. In this way, if three vessels, A B C, be used, then the reservoir shown in Fig. 1 may have its inner vessel, A, charged with three thousand pounds, the next vessel, B, with two thousand pounds, and the third or outermost vessel, C, with one thousand pounds without subjecting either vessel to an internal pressure of more than one thousand pounds over and above its external pressure, and this principle of differential resistance may be increased to any desired extent by varying the pressures in the several vessels or by increasing the number of outer vessels, and charging them successively with a diminishing pressure in an outward direction. The different pressures in the several vessels may be regulated either by hand or automatically, as by loaded valves $b$ $b'$ $b^2$ on pipes $c$ $c'$ $c^2$, connecting the several vessels each with the other, the valves being differently loaded, so as to shut off further supply of air or gas from each inner vessel when the supply in the next outer vessel reaches its required pressure; or the several vessels may be charged with air or gas at the required different pressures from independent sources.

It is not necessary that the several pressures should be regularly graduated, as here described, from the inner to the outer vessels; and in practice it will often be found convenient to vary this, and to have the difference greater in the outer vessels. By using a series of vessels, however, the one inclosing the other to be charged successively with different and diminishing pressures in an outward direction, the several vessels composing the reservoir or entire structure may be built to stand only a very limited pressure as compared with the pressure in the innermost vessel, and such vessels will be much easier to make and handle than a heavy single vessel having no graduated counteracting-pressure on its exterior; also a series of vessels thus combined and charged with different pressures will, as I have proved, admit of the innermost vessel holding a greater pressure than a single vessel having in it the same amount of metal as is contained in the several vessels.

Fig. 2 of the drawings shows the cylinder of a hydraulic press or other like machine, to which the invention may be applied in like manner, A being the inner vessel or working-cylinder proper, in which the fluid is at its greatest pressure; B, an outer vessel charged with fluid at a less pressure; C, another outer vessel charged with fluid at a still less pressure, and D another outer vessel having a still lower pressure, and so on, indefinitely or without limit as to the number of outer vessels.

Figure 3:
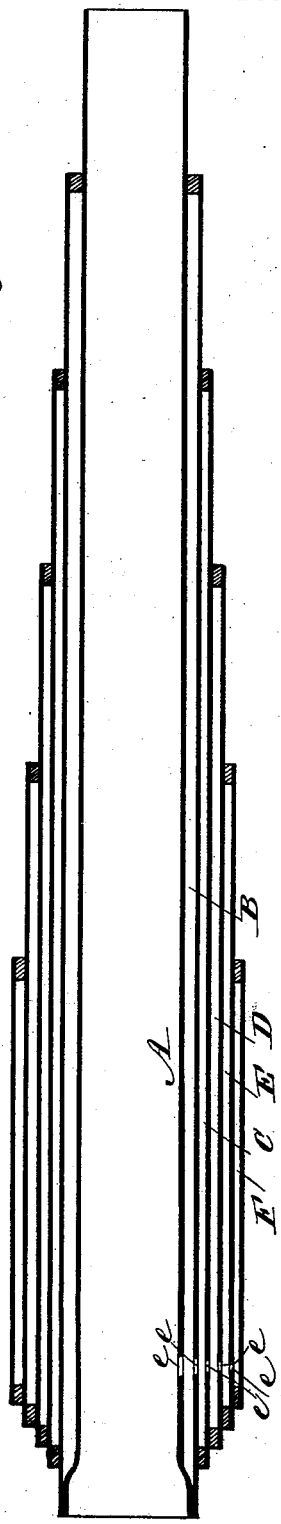

The cannon shown in Fig. 3 is constructed to act upon the same principle, A being the inner vessel or chamber in which the charge is exploded, and B C D E F a successive series of outer vessels, tubes, or chambers, connected with each other by apertures $e$, of such sizes that they will momentarily throttle the gases produced by explosion of the charge to the extent desired and cause each succeeding outer tube or chamber to be exposed to a decreasing pressure by the expansion of the gas within it.

Having thus described my invention, what I claim as new, and desire to secure by Letters Patent, is—

1. In vessels or structures exposed to high internal fluid, aeriform, or gaseous pressures, the method herein described of re-enforcing said vessels or structures, which consists in inclosing them with a series of casings, each succeeding outer one of which is subjected to a pressure less than that to which the one next within it is subjected, the outer pressure being dependent upon the inner pressure, substantially as herein set forth.

2. In vessels or structures exposed to high internal fluid, aeriform, or gaseous pressures, the method herein described of re-enforcing said vessels or structures, which consists in inclosing them in a series of casings, each succeeding outer one of which is charged with fluid, air, or gas of a less pressure than the one next within it, essentially as herein set forth.

EBENEZER HILL.

Witnesses:
H. P. PRICE,
JOHN A. SLATER.